United States Patent Office 3,013,029
Patented Dec. 12, 1961

3,013,029
PROCESS FOR THE PREPARATION OF
2,4-DIBROMO ALLOSTEROIDS
Alan Gibson Long, Greenford, England, and John Selwyn Hunt, Montrose, Angus, Scotland, assignors to Glaxo Laboratories Limited, Greenford, England
No Drawing. Filed July 26, 1957, Ser. No. 674,295
Claims priority, application Great Britain July 30, 1956
13 Claims. (Cl. 260—397.45)

This invention is concerned with the preparation of steroid substances, more particularly 2:4-dibromo-3-keto-11β-hydroxy allosteroids.

Prednisolone (11β:17α:21-trihydroxy-3:20-diketopregna-1:4-diene) and cortisol (11β:17α:21-trihydroxy-3:20-diketopregn-4-ene) are substances of increasing interest in the medical field and thus their syntheses are of considerable commercial importance. One possibility for the synthesis of such compounds involves the use of intermediates in the normal series i.e. from bile acid type starting materials whilst another possibility involves intermediates in the allo series, derived for example from such substances as hecogenin. The invention is concerned with the production of certain steroid compounds of the allo series which include in particular substances especially suited as intermediates for the synthesis of cortisol and prednisolone.

4:5α-dihydrocortisone and its esters are established as intermediates for the production of cortisone, and in general it is known that 3-keto-5α-steroids can be converted into 3-keto-$\Delta^4$ steroids (the 3-keto-$\Delta^4$ structure being characteristic of cortisone and other steroids of physiological importance) by a procedure involving dibromination of the 3-keto-5α-steroid followed by rearrangement to a 3-keto-2:4-dibromo-5α-steroid, reaction of the latter with sodium iodide to a 2-iodo-3-keto-$\Delta^4$ intermediate and subsequent removal of the iodine atom by reduction. In addition prednisone (1-dehydrocortisone) can be directly prepared by the double dehydrobromination of the 2:4-dibromo-3-keto compound above referred to. Prednisone and cortisone however have a keto group in the 11-position as opposed to the hydroxy group present in cortisol and prednisolone.

The application of the above-referred to procedures to analogous compounds having a hydroxy group in the 11-position (in place of the keto group), however leads to difficulties apparently due to side reactions involving inter alia the 11-hydroxy group. In particular in attempts to prepare 2:4-dibromo 4:5α-dihydrocortisol esters we find that the 11β-hydroxy group is often eliminated giving rise, in many case, to a $\Delta^{9(11)}$ compound as the only detectable product. It is therefore an object of this invention to provide a process for the preparation of such steroids wherein this difficulty is reduced or eliminated.

The formation of 2:4-dibromo-3-keto-5α-steroids from the corresponding 3-keto-5α compound apparently takes place by first brominating to yield a 2:2-dibromo-steroid which is then rearranged in the presence of hydrogen bromide (a specific catalyst for this reaction) to the desired 2:4-dibromo compound. The 2:2-dibromo compound is normally produced by brominating the starting material with two molecules of bromine and since hydrogen bromide is produced in this reaction, immediate rearrangement to the 2:4-isomer usually takes place.

In investigations which we have carried out on the acid-catalysed dibromination of allosteroids having a keto group in the 3-position and a β-hydroxy group in the 11-position (to yield the corresponding 2:4-dibromo compounds) we find that the troublesome side-reactions encountered are apparently caused by hydrogen ions derived from hydrogen bromide. The latter substance is, as stated above, essential as a catalyst for the formation of the 2:4-dibromo compound so that its presence is essential to this reaction. As a result of research we have found that it is possible to carry out the desired reaction in such a way that side reactions are substantially inhibited during the bromination and rearrangement.

This result is accomplished according to the invention by conducting the bromination in a solvent which is inert to the steroid substances present but which is reactive with hydrogen bromide substantially to inhibit its induction of side-reaction but which is insufficiently reactive with hydrogen bromide or bromine substantially to inhibit the desired bromination and rearrangement of the 2:2-dibromo-isomer to the corresponding 2:4-isomer. The solvent chosen (called for convenience "an inhibitory solvent"), is thus one which reacts in some degree with hydrogen bromide (for example by containing an atom acting as a proton acceptor or by actual chemical combination therewith) to inhibit the side-reactions but not to such an extent as substantially to hinder the formation of the desired 2:4-dibromo compound. As stated the solvent must be inert to the steroids present which in various cases precludes a number of solvents which might otherwise be suitable; thus the dihydroxy acetone sidechain characteristic of various cortical hormones, is well known to be unstable to various primary and secondary lower alcohols in the presence of hydrogen halides.

The suitability of any solvent may in cases of doubt be readily determined by preliminary trial. For example in the case of 4:5α-dihydrocortisol esters the starting material may first be contacted with hydrogen bromide in the presence of the selected solvent to ascertain whether dehydration takes place; a fall in rotation in such circumstance would tend to suggest that elimination of the 11-OH group was taking place, which may be confirmed by infra-red spectra evidence, and in some cases by paper chromatography. If the selected solvent passes this preliminary test (i.e. substantially no elimination of the 11-hydroxy group takes place under the stated conditions) the solvent may then be tested to determine whether it is suitable for the actual bromination; again change in rotation is useful evidence of whether or not bromination is taking place.

Particularly suitable inhibitory solvents are those, inert to the steroids in the reaction, which contain an oxygen atom. Of such solvents ethers are particularly suitable both straight chain and cyclic, for example, diethyl ether, diisopropyl ether, dioxan, tetrahydrofuran etc.; tetrahydrofuran is especially advantageous in that very good yields are obtained with it whilst it is non-toxic and readily handled.

According to the invention therefor we provide a process for the preparation of 2:4-dibromo-3 keto-11β-hydroxy-allosteroids by brominating the corresponding 3-keto-11β-hydroxyallosteroid in which there is used as solvent medium a solvent inert to the steroid reaction components but reactive with hydrogen bromide substantially to inhibit side reactions without substantial inhibition of the desired reaction.

In the process according to the invention it is generally convenient to add the bromine in solution in a solvent but it may be found that certain of the inhibitory solvents, defined above, e.g. tetrahydrofuran tend to react with bromine before the latter has a chance to enter the main reaction medium. In these circumstances it is advisable to add the bromine in a solvent which does not act as hydrogen bromide inhibitor. A satisfactory solvent for this purpose is acetic acid. As a result the main solvent medium becomes somewhat diluted. It may in any event be found advantageous to add a non-inhibitory solvent to the main solvent medium to improve its solubility characteristics and/or to moderate its influence on the course of the reaction. Suitable solvents for this purpose include saturated chlorinated hydrocarbons such as, for example, methylene chloride, chloroform or ethylene dichloride.

The reaction in general is carried out by adding bromine to a solution of the starting steroid in the selected inhibitory solvent, preferably in an amount of from 2.0 to 2.5, advantageously 2.1 molecular equivalents; hydrogen bromide may also be added (apart from that formed during bromination) but the total amount present, i.e. that added together with that formed during the bromination should not be in excess of that which can be effectively inhibited by the solvent used; in the case of dioxan for example the total hydrogen bromide concentration should preferably not exceed 0.5 N and, in the case of tetrahydrofuran/acetic acid this should not exceed 1.0 N.

The reaction is conveniently carried out at temperatures within the range of from −10° to +40° C., preferably at +5° to +20° C.

The compounds prepared according to the present invention are, as will be clear, useful as intermediates for the preparation of steroids having a keto group and unsaturation in ring A and an 11β-hydroxy group. The present invention is of particular value in the preparation of 2:4-dibromo-4:5α-dihydrocortisol and its 21-esters, particularly the 21-acetate, which substances are of course of value in the synthesis of cortisol and prednisolone, and which may be represented as follows:

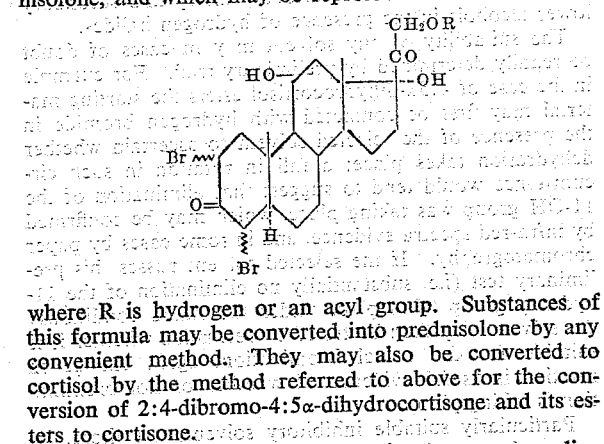

where R is hydrogen or an acyl group. Substances of this formula may be converted into prednisolone by any convenient method. They may also be converted to cortisol by the method referred to above for the conversion of 2:4-dibromo-4:5α-dihydrocortisone and its esters to cortisone.

The starting materials used in the process according to this invention can be prepared in any convenient way. In the case of 4:5α-dihydrocortisol esters we prefer to start from a 4:5α-dihydrocortisone ester, protect the keto groups in the 3- and 20-positions by the method described in application Ser. No. 584,423, now Patent No. 2,880,218 reduce the resulting derivative with a metal hydride reducing agent e.g. an alkali metal or alkaline earth metal borohydride followed by decomposition of the resulting ketonic derivative and if desired reacylation at position 21.

The reduction of the 11-keto group may, for example, be carried out with sodium borohydride, in a solvent e.g. a mixture of alcohol, methylene chloride and water; other solvents which may be used include aqueous dioxan, aqueous tetrahydrofuran as well as various aqueous alcohols. A suitable temperature for the reduction is 10–100° C.

The most convenient derivative of the 3- and 20-keto groups to make for the purpose of protection is the bis-semicarbazone. In the case of the bis-semicarbazone of 4:5α-dihydrocortisol, decomposition is most conveniently effected with mineral acid, e.g. using 4 N hydrochloric acid at room temperature. This is in contrast to the usual mode of decomposing steroid semicarbazones which involves heating in the presence of acetic and pyruvic acid or the use of nitrous acid.

For the better understanding of the invention the following examples are given only as illustration:

EXAMPLE 1

2α:4α-dibromo-11β-hydroxyergostan-3-one

A solution of 11β-hydroxyergostan-3-one (5 g.) in pure dioxan (197 ml.) at 12° C., was treated with a drop of 4 N-hydrogen bromide in dioxan, and then bromine (3.93 g.; 1.27 ml.; 2.05 mole) was added over 2 min. The solution (0.125 N with respect to hydrogen bromide) was allowed to stand for 80 min. (so that the optical rotation of an aliquot of the solution had ceased to decrease further); it was poured into dilute sodium bicarbonate solution with stirring, and the precipitated steroid collected, washed with water and dried. The solid (7.0 g.), $[\alpha]_D^{24}$ +16° (c., 0.9 in $CHCl_3$) was crystallised from ethanol, giving 2α:4α-dibromo-11β-hydroxyergostan - 3 one (3.82 g.; 56%), M.P. 192-200° C. (decomp.). Recrystallisation from ethanol afforded needles (2.11 g.; 33%), M.P. 213–214° C. (decomp.), $[\alpha]_D^{23}$ +12° (c., 1.0 in $CHCl_3$).

EXAMPLE 2

2:4-dibromo-4:5α-dihydrocortisol 12-acetate

To a solution of 4:5α-dihydrocortisol 21-acetate (1 g.) in pure dioxan (43 ml.) at 22° C., was added 4 N-hydrogen bromide in dioxan (1 drop) followed by bromine (0.863 g.; 0.278 ml.; 2.2 mol. equiv.), added over 45 sec. The pale yellow solution (0.125 N in HBr) was allowed to stand at 20° C. for 50 min., poured into dilute sodium bicarbonate solution and the precipitated dibromo steroid collected, washed with water and dried, giving a solid (1.145 g.), $[\alpha]_D^{18}$ +47° (c., 0.76 in $CHCl_3$), (Found: Br, 28.5%.)

EXAMPLE 3

2:4-dibromo-4:5α-dihydrocortisol 21-acetate

4:5α-dihydrocortisol 21-acetate (4.0 g.) was dissolved in dioxan (152 ml.) at 20° C. and bromine (1.12 ml.) was added to the stirred solution during one minute. After sixty minutes the solution was poured into water (about 1600 ml.) containing saturated sodium bicarbonate solution (60 ml.). The flocculent white precipitate was collected after two hours, washed with water and dried. Yield 4.9 g.

EXAMPLE 4

2:4-dibromo-4:5α-dihydrocortisol 21-acetate

Bromine (0.28 ml.) was added over a period of 1 minute to a stirred solution of 4:5α-dihydrocortisol 21-acetate (1.0 g.) in methylene chloride (36 mls.) and isopropyl ether (4 mls.). The specific rotation of the solution became steady after 60 minutes and the solution was then washed successively with water, sodium bicarbonate solution and water. The solution was dried and removal of the solvent under reduced pressure gave the crude 2:4-dibromo compound (1.41 g.), $[\alpha]_D$ +55° (c., 0.5 in $CHCl_3$). (Found: Br, 29%.)

EXAMPLE 5

Bromination of 4:5α-dihydrocortisol 21-acetate in methylene chloride/tetrahydrofuran A suspension of finely powdered 4:5α-dihydrocortisol 21-acetate (10.0 g.) in methylene chloride (285 ml.) and tetrahydrofuran (15 ml.) was treated with bromine (8.7 g.; 2.2 mols.) over 4 mins. at room temperature. The rotation of the solution fell from 3.84° immediately after bromination had been completed, to 2.13° 47 mins. later. The solution was poured into aqueous sodium bicarbonate, washed with water, dried and evaporated under reduced pressure to give 2:4-dibromo-4:5α-dihydrocortisol 21-acetate as a pale yellow gum, $[\alpha]_D^{20}$ +41° (c., 0.4 in $CHCl_3$); Br, found 30.8%.

This product on dehydrobromination gave prednisolone acetate identical in all respects with authentic material.

EXAMPLE 6

*Bromination of 4:5α-dihydrocortisol 21-acetate in methylene chloride/diethyl ether*

A suspension of 4:5α-dihydrocortisol 21-acetate (3.0 g.) in methylene chloride (108 ml.) and diethyl ether (12 ml.) was treated with bromide (0.84 ml.; 2.2 mols.) at room temperature. The rotation of the solution fell from 2.70° immediately after bromination to 1.75° after 44 mins. The solution was washed with aqueous bicarbonate and water and then dried. Evaporation to dryness gave 2:4-dibromo-4:5α-dihydrocortisol 21-acetate as a pale yellow amorphous solid (4.43 g.), $[\alpha]_D^{24}$ +47° (c., 0.4 in $CHCl_3$) (Br, found 27.7%) which product, on dehydrobromination gave prednisolone acetate identical in all respects with authentic material.

EXAMPLE 7

*Preparation of 2:4-dibromo-4:5α-dihydrocortisol 21-acetate and cortisol 21-acetate*

To a solution of 21-acetoxy-11β:17α-dihydroxy-5α-pregnane-3:20-dione (1 g.) in pure dioxan (43 ml.) at 22° C. was added 4 N-hydrogen bromide in doxan (1 drop) followed by bromine (0.863 g.; 0.278 ml.) over a period of 45 secs. The pale yellow solution was allowed to stand at 20° C. for 50 min. poured into dilute sodium hydrogen carbonate solution and the precipitated dibromo-steroid collected, washed with water, and dried, giving a solid (1.145 g.), $[\alpha]_D^{18}$ +47° (c., 0.76 in $CHCl_3$). (Found: Br, 28.5%.) The crude product was added to a mixture of sodium iodide (3.6 g.) and a bromoacetone solution (5 ml.) (made from bromine (1 ml.) and acetone (30 ml.)) (see Evans et al., J.C.S., 1956, 4356), in acetone (28 ml.), the mixture having been refluxed previously for 15 min. After being refluxed for 2 hours, the whole mixture was cooled, filtered to remove sodium bromide, an inert atmosphere being maintained by the addition of solid carbon dioxide. 1.6 N-aqueous chromous chloride was added. After 15 min. the green solution was diluted with water and extracted with methylene chloride. The residue (0.74 g.), $[\alpha]_D^{18}$ +109° (c., 0.5 in $CHCl_3$), from the water-washed extract was suspended in dry ethanol (15 ml.) glacial acetic acid (1 ml.) containing Girard P reagent (0.5 g.) was added and the mixture refluxed for 30 mins. After being cooled to 20° C., the solution was treated with 40% aqueous formaldehyde (2 ml.), left to stand for 25 minutes, and poured into a solution of saturated sodium hydrogen carbonate (150 ml.) and water (100 ml.). Ethyl acetate then extracted a by-product (0.19 g.), λ max. 237 mμ

$(E^{1\%}_{1cm.} 48)$

The aqueous phase was acidified to pH 1.0 with 2 N-hydrochloric acid, allowed to stand for several hours and extracted with methylene dichloride, in which it was washed with water, and dried. The residue (0.48 g.) obtained on evaporation was crystallised from ethyl acetate (charcoal). Slightly impure material (0.155 g., 15%), M.P. 201–216° C., was so obtained. Further crystallisations from ethyl acetate, then from acetone gave rhombs of pure cortisol 21-acetate (0.10 g., 10%), M.P. 215–221° C., $[\alpha]_D^{24}$ +158° (c., 0.6 in dioxan), λ max. 242 mμ (ε 15,200).

EXAMPLE 8

*2:4-dibromo-4:5α-dihydrocortisol 21-acetate*

A solution of bromine (2.68 ml.) in glacial acetic acid (25 ml.) was added to a stirred suspension of 4:5α-dihydrocortisol 21-acetate (10 g.) in tetrahydrofuran (100 ml.) to which had been added 6 N-hydrogen bromide in acetic acid (1 ml.). The temperature was maintained at 5 to 10° C. during this addition then rapidly warmed to 20° C. and maintained at that temperature for 25 minutes. The reaction mixture was poured into a stirred suspension of sodium bicarbonate (35 g.) in water (100 ml.). The organic layer was separated and washed with a solution of sodium bicarbonate (8 g.) and ammonium sulphate (50 g.) in water (100 ml.) and finally dried over anhydrous sodium sulphate. The tetrahydrofuran was removed under reduced pressure to leave 21-acetoxy-11β:17α - dihydroxy-2:4-dibromo-5α-pregnane-3:20-dione as a yellow brown oil containing about 25% by weight of 4-bromo-butyl acetate. The crude product was dehydrobrominated to give pure prednisolone acetate identical with authentic material.

Although in the foregoing description the process is described with reference to certain compounds it will be clear to those skilled in the art that one may also use a wide variety of other 3-keto-11β-hydroxy allosteroids within the spirit of the invention. It will also be clear that one can use esters other than 4:5α-cortisol 21-acetate such as the corresponding propionate, butyrate, hemisuccinate, benzoate etc.

We claim:

1. In a process for the preparation of a 2:4-dibromo-3-keto-11β-hydroxy allosteroid of the ergostane and allopregnane series wherein the corresponding unbrominated 3-keto-11β-hydroxy allosteroid is brominated at a temperature of from −10° to +40° C. with from 2.0 to 2.5 molecular equivalents of free bromine for each molecular equivalent of said starting allosteroid and hydrogen bromide is produced, the improvement which comprises conducting the reaction in isopropyl ether.

2. In a process for the preparation of a 2:4-dibromo-3-keto-11β-hydroxy allosteroid of the ergostane and allopregnane series wherein the corresponding unbrominated 3-keto-11β-hydroxy allosteroid is brominated at a temperature of from −10° to +40° C. with from 2.0 to 2.5 molecular equivalents of free bromine for each molecular equivalent of said starting allosteroid and hydrogen bromide is produced, the improvement which comprises conducting the reaction in diethyl ether.

3. In a process for the preparation of a 2:4-dibromo-3-keto-11β-hydroxy allosteroid of the ergostane and allopregnane series wherein the corresponding unbrominated 3-keto-11β-hydroxy allosteroid is brominated at a temperature of from −10° to +40° C. with from 2.0 to 2.5 molecular equivalents of free bromine for each molecular equivalent of said starting allosteroid and hydrogen bromide is produced, the improvement which comprises conducting the reaction in tetrahydrofuran.

4. A process as defined in claim 3, in which the bromine is added to the reaction mixture in solution in acetic acid.

5. A process as defined in claim 3, in which the bromine is used in an amount of 2.1 molecular equivalents per molecular equivalent of starting material.

6. A process as defined in claim 3 in which the reaction is carried out at a temperature within the range of +5° to +20° C.

7. In a process for the preparation of a 2:4-dibromo-4:5α-dihydrocortisol and 21-esters thereof derived from an acid selected from the group consisting of lower alkanoic, succinic and benzoic acids wherein the corresponding unbrominated compound is brominated at a temperature of from −10° to +40° C. with from 2.0 to 2.5 molecular equivalents of free bromine for each molecular equivalent of said unbrominated compound and hydrogen bromide is produced, the improvement which comprises conducting the reaction in isopropyl ether.

8. In a process for the preparation of 2:4-dibromo-4:5α-dihydrocortisol and 21-esters thereof, derived from an acid selected from the group consisting of lower alkanoic, succinic and benzoic acids wherein the corresponding unbrominated compound is brominated at a temperature of from −10° to +40° C. with from 2.0 to 2.5 molecular equivalents of free bromine for each molecular equivalent of said unbrominated compound and hydrogen bromide is produced, the improvement which comprises conducting the reaction in tetrahydrofuran.

9. A process for the preparation of 2:4-dibromo-4:5α- dihydrocortisol 21-acetate, which comprises brominating at a temperature of from −10° to +40° C., the corresponding unbrominated compound in tetrahydrofuran with from 2.0 to 2.5 molecular equivalents of free bromine for each molecular equivalent of said unbrominated compound with the production of hydrogen bromide and maintaining the total concentration of hydrogen bromide at a value of not more than 1.0 N.

10. A process as defined in claim 9 in which the reaction is carried out at a temperature within the range of +5° to +20° C.

11. In a process for the preparation of a 2:4-dibromo-4:5α-dihydrocortisol and 21-esters thereof, derived from an acid selected from the group consisting of lower alkanoic, succinic and benzoic acids wherein the corresponding unbrominated compound is brominated at a temperature of from −10° to +40° C. with from 2.0 to 2.5 molecular equivalents of free bromine for each molecular equivalent of said unbrominated compound and hydrogen bromide is produced, the improvement which comprises conducting the reaction in diethyl ether.

12. In a process for the preparation of a 2:4-dibromo-3-keto-11β-hydroxy allosteroid of the ergostane and allopregnane series wherein the corresponding unbrominated 3-keto-11β-hydroxy allosteroid is brominated at a temperature of from −10° to +40° C. with from 2.0 to 2.5 molecular equivalents of free bromine for each molecular equivalent of said starting allosteroid and hydrogen bromide is produced, the improvement which comprises conducting the reaction in a mixture of tetrahydrofuran and a saturated chlorinated hydrocarbon.

13. A process as defined in claim 12, in which said saturated chlorinated hydrocarbon is selected from the group consisting of methylene chloride, chloroform and ethylene dichloride.

References Cited in the file of this patent

UNITED STATES PATENTS

| 2,684,375 | Oliveto | July 20, 1954 |
| 2,783,254 | Gould et al. | Feb. 26, 1957 |
| 2,888,473 | Joly et al. | May 26, 1959 |

FOREIGN PATENTS

| 738,828 | Great Britain | Oct. 19, 1955 |

OTHER REFERENCES

"Journal of Chemical Society" (1956), article by Kirk et al., pages 1184–6 relied on.

"J.A.C.S." Rosenkranz, vol. 72, pages 1046 and 1079–4081.